(12) United States Patent
Lee

(10) Patent No.: US 8,578,212 B2
(45) Date of Patent: Nov. 5, 2013

(54) REMOTE COMMUNICATION SYSTEM AND METHOD

(75) Inventor: Byung Jin Lee, Cheongju (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 288 days.

(21) Appl. No.: 13/093,774

(22) Filed: Apr. 25, 2011

(65) Prior Publication Data

US 2011/0276839 A1     Nov. 10, 2011

(30) Foreign Application Priority Data

May 7, 2010    (KR) ........................ 10-2010-0043116

(51) Int. Cl.
*G06F 11/00* (2006.01)

(52) U.S. Cl.
USPC ........................................................... 714/27

(58) Field of Classification Search
USPC ........................................................... 714/27
See application file for complete search history.

(56) References Cited

U.S. PATENT DOCUMENTS

| | | | | |
|---|---|---|---|---|
| 4,972,290 | A * | 11/1990 | Sun et al. | 361/64 |
| 6,469,629 | B1 * | 10/2002 | Campbell et al. | 340/635 |
| 7,085,938 | B1 * | 8/2006 | Pozzuoli et al. | 713/300 |
| 2004/0138835 | A1 * | 7/2004 | Ransom et al. | 702/62 |
| 2005/0138432 | A1 * | 6/2005 | Ransom et al. | 713/201 |
| 2005/0240545 | A1 * | 10/2005 | Schachtely et al. | 706/47 |
| 2005/0262236 | A1 * | 11/2005 | Schachtely et al. | 709/224 |
| 2009/0070447 | A1 * | 3/2009 | Jubinville et al. | 709/223 |
| 2012/0019355 | A1 * | 1/2012 | Katayama et al. | 340/5.6 |
| 2012/0265360 | A1 * | 10/2012 | Smit | 700/293 |

FOREIGN PATENT DOCUMENTS

| | | |
|---|---|---|
| JP | 05089000 | 4/1993 |
| JP | 10-126860 | 5/1998 |
| JP | 10126860 | 5/1998 |
| JP | 2001-231185 | 8/2001 |
| JP | 2003-229859 | 8/2003 |
| JP | 2003229859 | 8/2003 |
| JP | 2004320267 | 11/2004 |
| JP | 2008071197 | 3/2008 |

OTHER PUBLICATIONS

The State Intellectual Property Office of the People's Republic of China Application Serial No. 201110120253.9, Office Action dated Apr. 17, 2013, 9 pages.

* cited by examiner

*Primary Examiner* — Amine Riad
(74) *Attorney, Agent, or Firm* — Lee, Hong, Degerman, Kang & Waimey

(57) ABSTRACT

Disclosed is a remote communication system and method. A remote communication system includes a digital protection relay and a remote monitoring system. The digital protection relay stores and maintains fault indices for identifying a predetermined number of faults that have occurred, fault time tags corresponding to the fault indices and fault data corresponding to the fault indices. The remote monitoring system sets a fault index, a fault time tag, a fault data block size to be communicated at a time and a fault data block index for specifying a fault data block to be communicated, and requests the digital protection relay of a fault data block.

13 Claims, 5 Drawing Sheets

FIG. 3

| FAULT INDEX | FAULT TIME TAG | FAULT DATA |
|---|---|---|
| ⋮ | ⋮ | ⋮ |

* FAULT INDEX = 0 ~ (n-1)

REMOTE COMMUNICATION SYSTEM AND METHOD

CROSS-REFERENCE TO RELATED APPLICATION

Pursuant to 35 U.S.C. 119(a), this application claims the benefit of earlier filing date and right of priority to Korean Application No. 10-2010-0043116, filed on May 7, 2010, the contents of which is incorporated by reference herein in its entirety.

FIELD OF THE DISCLOSURE

An aspect of the disclosure relates to a remote communication system and method in a system using a digital protection relay.

DISCUSSION OF THE RELATED ART

In general, a digital protection relay is a device that is installed in a power system such as power generation or power transmission/distribution so as to monitor a state of the power system. If a defect occurs in a power system, the digital protection relay protects the power system and a load appliance by breaking a circuit between the power system and the load appliance through the operation of a breaker.

The digital protection relay is generally connected to a remote monitoring system that is a superior computer system through a communication network. The remote monitoring system collects data through the communication network, and uses the data so as to perform stable operation of the power system. Here, the data include the amount of electricity processed by the digital protection relay, fault information, and the like. Particularly, information on a fault caused due to a defect of the power system plays an important role in the analysis of an accident.

Conventionally, simple information such as the presence of occurrence of a fault, the kind of the fault and accident time tag was required. However, recently, a larger number of information has been gradually required to perform a more exact analysis of an accident. For example, the digital protection relay samples, up to 16 to 64 times per period, voltage, current, digital input/output information and the like at the time of the accident, and stores the sampled data as an accident waveform. Then, the digital protection relay transmits the accident waveform based on a request of the remote monitoring system. In order to perform the exact analysis of the accident, it is required to store and maintain information for a predetermined time (e.g., 1 second) or more including before/after the accident.

As the size of data to be managed by the digital protection relay increases, date size to be transmitted to the remote monitoring system also increases.

Meanwhile, two types of methods are generally used as the communication method in which fault data are communicated between the digital protection relay and the remote monitoring system.

In the first method, the remote monitoring system requests the digital protection relay to transmit data with the maximum size, which can be received by the remote monitoring system. Then, the digital protection relay gathers fault data to have the corresponding size and transmits the gathered fault data to the remote monitoring system at a time. DNP protocol may be used as a specific example of the communication protocol using the method.

In the second method, the remote monitoring system requests the digital protection relay to transmit fault data as the unit of data with a small size due to the limitation of the size of data transmitted on the communication protocol, and the digital protection relay transmits the fault data at the unit of the corresponding size to the remote monitoring system. MODBUS protocol may be used as a specific example of the communication protocol using the method. The MODBUS protocol is used by assigning an address to each accident waveform data on the communication protocol.

In the former case, the remote monitoring system necessarily receives, through a several-time data exchange operations, the fault data to be transmitted to the remote monitoring system from a database in which communication software of the digital protection relay stores the fault data.

Therefore, it takes much time until the remote monitoring system request the fault data and then receives its response. When the digital protection relay communicates a large amount of data, communication of contact state data that requires ordinary monitoring or data that requires other rapid treatment is also delayed.

In the latter case, as the size of the fault data increases, the size of the address assigned on the communication process increases together, and therefore, the communication protocol cannot accept the fault data. For example, the MODBUS protocol defines an address and performs an operation of reading or writing the address. Since the size of one address is 1 word (2 bytes), one address is necessarily assigned to each word of the fault data so as to read the fault data with a large capacity. In this case, the size of the address to be assigned is extremely large, and therefore, it is unsuitable to deal with the fault data.

As described above, in the conventional methods of communicating fault data with a large capacity between the remote monitoring system and the digital protection relay, the response of other data is delayed due to the communication of the fault data, or it is difficult to deal with large-capacity data due to the limitation of the size of data transmitted on the communication protocol.

SUMMARY OF THE DISCLOSURE

Embodiments of the disclosure provide a remote communication system and method which allows a process of communicating fault data with a large capacity between a digital protection relay and a remote monitoring system not to be influenced by the size of data transmitted on a communication protocol, and enables communications to be more rapidly performed.

According to an aspect of the disclosure, there is provided a remote communication system, the system including: a digital protection relay configured to store and maintain fault indices for identifying a predetermined number of faults that have occurred, fault time tags corresponding to the fault indices and fault data corresponding to the fault indices; and a remote monitoring system configured to set a fault index, a fault time tag, a fault data block size to be communicated at a time and a fault data block index for specifying a fault data block to be communicated, and to request the digital protection relay of the fault data block.

According to another aspect of the disclosure, there is provided a remote communication method of performing communications between a digital protection relay and a remote monitoring system, the method including: storing fault indices for identifying a predetermined number of faults that have occurred, fault time tags corresponding to the fault indices and fault data corresponding to the fault indices;

receiving a request for specific fault data from the remote monitoring system; and transmitting a corresponding fault data block to the remote monitoring system based on a fault index, a fault time tag, a fault data block size and a fault data block index, received from the remote monitoring system, among the stored fault data.

According to still another aspect of the disclosure, there is provided a remote communication method of performing communications between a digital protection relay and a remote monitoring system, the method including: setting a fault index, a fault time tag, a fault data block size to be communicated at a time and a fault data block index for specifying a fault data block to be communicated, and requesting the digital protection relay of a fault data block; and receiving the fault data block from the digital protection relay.

Preferably, the digital protection relay and the remote monitoring system may transmit and receive large-capacity fault data from and to each other by dividing the fault data into fault data blocks to have a proper fault data block size, and the respective fault data blocks are specified in a user-defined area of a communication frame.

The remote communication system and method using the same according to the present disclosure has and advantageous effect in that, it is unnecessary to perform an operation of assigning an address to each fault data block for the purposed of transmission of large-capacity fault data whereby large-capacity fault data can be transmitted and received regardless of the limitation of the size of data transmitted according to the kind of communication protocol.

The remote communication system and method using the same have another advantageous effect in that, since large-capacity fault data are not collectively transmitted but transmitted and received by dividing the fault data into data blocks to have a proper fault data block size, it does not take much time to exchange fault data in the interior of the digital protection relay, whereby it is possible to solve the problem of a communication delay such as a delay of time taken to transmit response data to the remote monitoring system or a delay of transmission of other data.

Thus, although the size of fault data is changed, it is possible to easily overcome the change in the size of fault data without changing a communication protocol and the swiftness and stability of data transmission is improved as compared with the conventional method, thereby facilitating the analysis of a fault accident.

BRIEF DESCRIPTION OF THE DRAWINGS

These and/or other aspects and advantages of the disclosure will become apparent and more readily appreciated from the following description of the embodiments, taken in conjunction with the accompanying drawings of which:

FIG. 3 is a view showing a structure of a database that stores fault data;

DETAILED DESCRIPTION OF PREFERRED EMBODIMENTS

The disclosure now will be described more fully hereinafter with reference to the accompanying drawings, in which preferred embodiments of the disclosure are shown. The disclosure may, however, be embodied in many different forms and should not be construed as limited to the embodiments set forth herein.

It will be understood that, although the terms "first", "second", etc. may be used herein to describe various components, these components should not be limited by these terms. These terms are only used to distinguish one component from another component. Thus, a "first" component discussed below could also be termed a "second" component without departing from the teachings of the disclosure.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be understood that the accompanying drawings are enlarge or shrank properly for convenience of illustration. Like numerals refer to like elements throughout.

Figure 1:
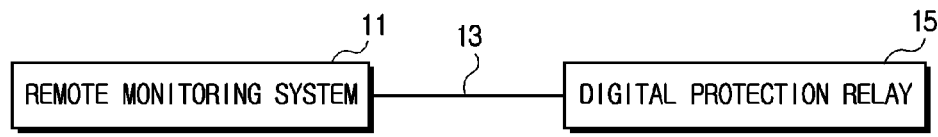
FIG. 1 is a schematic view showing a connection between a digital protection relay and a remote monitoring system according to the disclosure.

FIG. 1 is a schematic view showing a connection between a digital protection relay and a remote monitoring system according to the disclosure.

Referring to FIG. 1, the digital protection relay 15 is a device used to monitor and protect the state of a power system. If a fault occurs in a power system, the digital protection relay 15 protects the power system and a load appliance by breaking a circuit between the power system and the load appliance.

The digital protection relay 15 is connected to the remote monitoring system 15 that is a superior computer system through a communication network 13 such as Ethernet.

Figure 2:
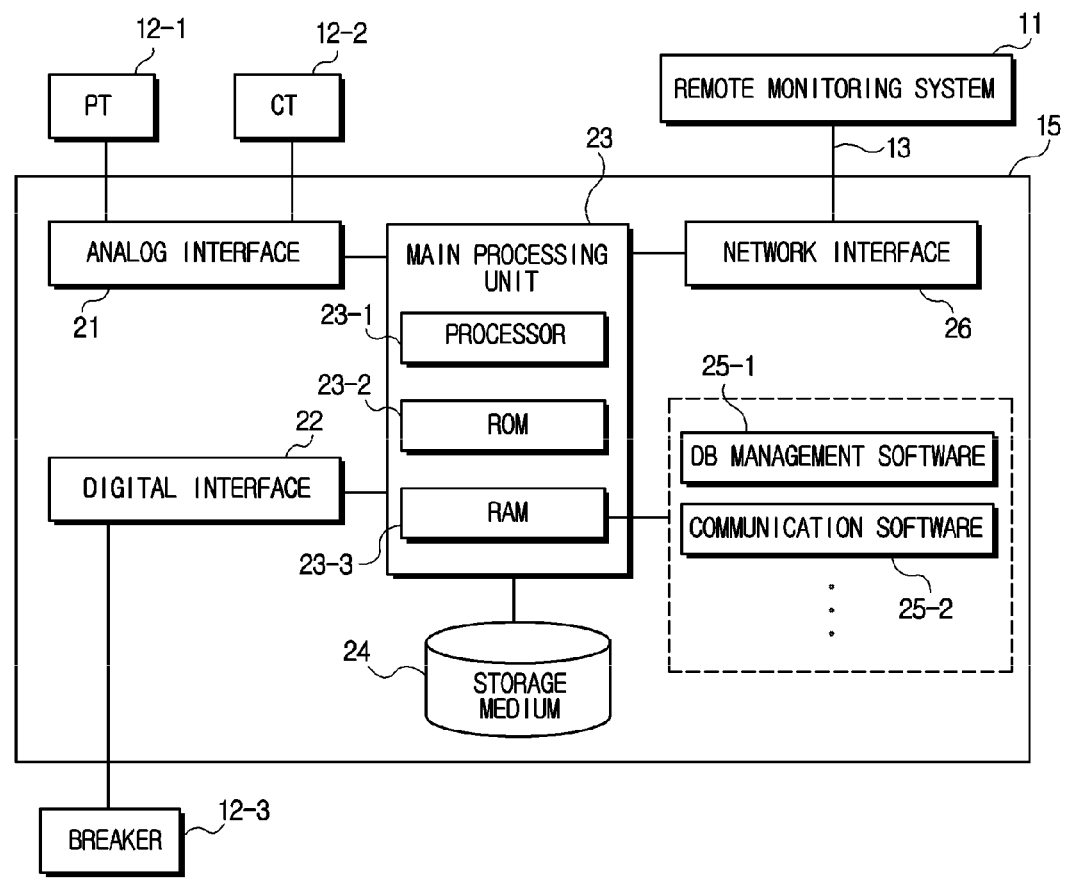
FIG. 2 is a block diagram showing an example of the digital protection relay.

The digital protection relay 15 may be variously configured depending on the kind and use thereof. An example of the digital protection relay is shown in FIG. 2.

An analog interface 21 receives an analog signal from a potential transformer 12-1, a current transformer 12-2 and the like, and converts the analog signal into a digital signal. Then, the analog interface 21 transfers the converted digital signal to a main processing unit 23. Here, the potential transformer 12-1 detects voltage from the power system, and the current transformer 12-2 detects current from the power system.

The main processing unit 23 includes a processor 23-1 that generally controls the operation of the digital protection relay 15, a read only memory (ROM) 23-2 that stores a basic computer program for operating the digital protection relay 15, and a random access memory (RAM) 23-3 that temporarily stores data during the operation of the digital protection relay 15. A microprocessor, central processing unit (CPU) or the like may be used as the processor 23-1.

A digital interface 22 inputs and outputs a digital signal. For example, the digital interface 22 enables the main processor 23 to output a break signal (trip signal) to a breaker 12-3 in the occurrence of an accident and to break the circuit in which a fault occurs.

A network interface 26 communicates with the remote monitoring system 11 through the communication network 13 such as the Ethernet. The network interface 26 transmits and receives data according to a communication protocol, such as DNP or MOBUS protocol, used in the communication between the digital protection relay 15 and the remote monitoring system 11.

A storage medium 24 has a nonvolatile property in which the reading or writing of digital data is possible, and stores various types of information related to the operation of the digital protection relay 15.

If the driving of the digital protection relay 15 is started, the processor 23-1 of the main processing unit 23 operates the digital protection relay 15 by storing various kinds of software stored in the ROM 23-2 or the storage medium 24 into the RAM 23-3 and driving the software stored in the RAM 23-3. The kind of software necessary for the operation of the digital protection relay 15 may be variously configured, if necessary. For example, the software may include a DB management software 25-1 that maintains a database related to the fault data in the storage medium 24, a communication software 25-2 that takes charge of a communication operation with the remote monitoring system 11. The DB management software 25-1 stores and maintains various kinds of fault data in the database of the storage medium 24.

As an example shown in FIG. 3, a database 31 managed by the DB management software 25-1 includes fault indices for respectively identifying n faults that have recently occurred, fault time tags corresponding to the respective fault indices, and fields in which fault data corresponding to the respective fault indices are stored.

The fault indices are sequentially assigned to the n faults that have recently occurred in the occurrence order. For example, when assuming that the value of n is 1000, n fault data that have recently been generated are maintained in the database 31.

In a case the number of fault data exceeds 1000, the oldest fault data are removed, and newly generated fault data are inputted corresponding to the corresponding fault index. That is, whenever a fault occurs, the fault index is increased from 0 to 999. If a fault again occurs after the fault index becomes 999, the time tag and fault data of the fault that has newly occurred are inputted in the oldest fault index.

The sizes of a fault time tag field and a fault data field may be arbitrarily set. As will be illustrated in the following example, the fault time tag field has a size of 6 bytes, the size of the fault data may be fixedly or variably managed.

If a fault occurs, the communication software 25-2 notifies the remote monitoring system 11 of a message informing that the corresponding fault occurs, e.g., information on a fault index corresponding to the fault, a fault time tag and a kind of fault, and the like.

Accordingly, the remote monitoring system 11 can monitor, from the digital protection relay, contents related to when a fault has occurred and which fault has occurred.

Figure 4:
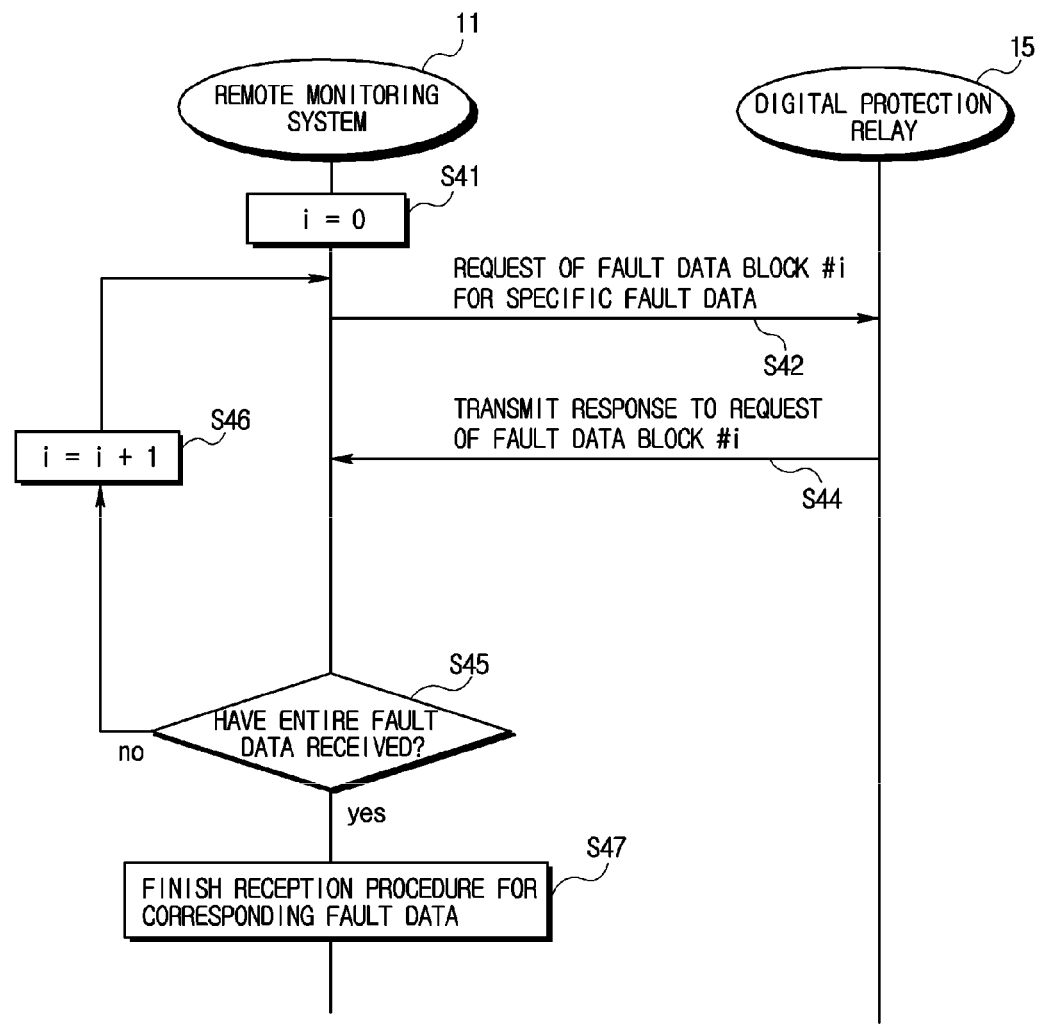
FIG. 4 is a flowchart illustrating an embodiment of a remote communication method according to the disclosure.

A remote communication method of the digital protection relay according to the disclosure will be described with reference to FIG. 4.

The remote monitoring system 11 intended to receive specific fault data from the digital protection relay sets a variable "i" (S41), and request the digital protection relay 15 to transmit an i-th fault data block for the specific fault data (S42).

That is, data are transmitted and received as the unit of a fault data block with a predetermined size between the remote monitoring system 11 and the digital protection relay 15. Hence, in a case where the whole size of the fault data that the remote monitoring system 11 intends to receive from the digital protection relay 15 is larger than the size of the fault data block, the transmission and reception of the data are necessarily performed a few times. Here, the variable "i" functions to specify which fault data block is currently transmitted and received.

At the step S42, information on a fault index, a fault time tag, a fault data block size and a fault data block index is required so that the remote monitoring system 11 requests the digital protection relay 15 of fault data.

Figure 5:
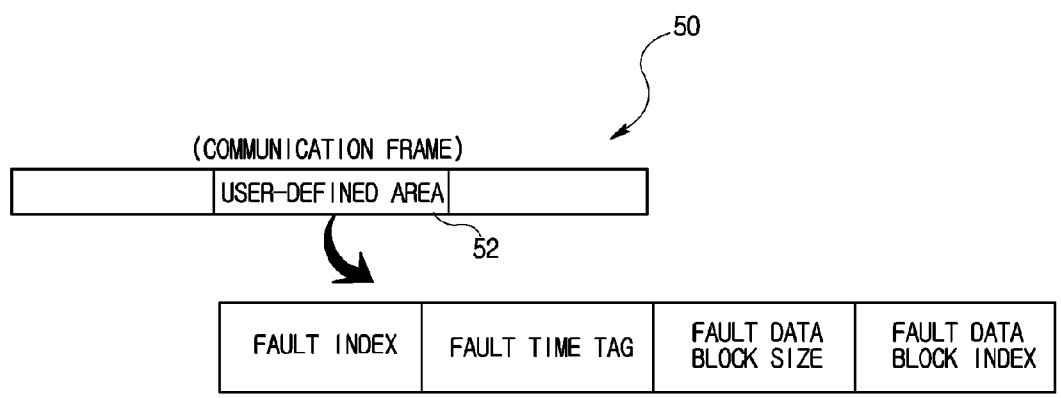
FIG. 5 is a view showing an example of a user-defined area in a communication frame.

The fault index, the fault time tag, fault data block size and the fault data block index are set in a user-defined area 52 of a communication frame 50 as shown in FIG. 5.

The other area of the communication frame 50 is determined according to a communication protocol. For example, the MODBUS protocol includes communication area code, function code, cyclic redundancy checking (CRC), and the like.

Although the fault index, the fault time tag, fault data block size and the fault data block index are information required for the remote monitoring system 11 to receive the specific fault data from the digital protection relay 15, they are necessarily transmitted the digital protection relay at a time. An embodiment related to this will be described later.

The fault index and the fault time tag have the same meaning as those used when the digital protection relay 15 manages fault data in a database. The fault index and the fault time tag are used as information for specifying fault data intended to be received by the remote monitoring system 11.

As described above, n fault indices are maintained in the database of the digital protection relay 15. If an additional fault occurs, the fault data related to the longest fault index is removed, and hence one fault can be completely specified by combining the fault index and the fault time tag.

The fault time tag may be expressed using various methods. As one example, the fault time tag may be represented as data of 6 bytes, which is indicated in the form of year/month/day/hour/minute/second/millisecond. In this instance, 2 bytes are assigned to the year/month. In the upper byte, the value after year 2000 may be indicated in the form of binary coded decimal (BCD). In the lower byte, the value from January to December may also be indicated in the form of BCD. For example, the value of 2009/January is indicated as '0x0901.' Four bytes are assigned to the day/hour/minute/second/millisecond. The day (1 to 31) may be indicated in the upper 5 bits, and the value obtained by calculating the hour/minute/second/millisecond as the unit of millisecond may be indicated in the other lower bits. For example, the value of 20/17/19/54/598ms is indicated as '0xA3B810E6.'

The fault data block size specifies the size of fault data to be transmitted and received between the remote monitoring system 11 and the digital protection relay 15 at a time. The fault data block size may be set as 256 bytes, 512 bytes or the like The fault data block index specifies to which section a fault data block to be currently transmitted and received in the fault data intended to be received by the remote monitoring system 11 belongs.

If the request of fault data block #i transmitted by the remote monitoring system 11 is received at the step S42, the communication software 25-2 of the digital protection relay 15 fetches the corresponding fault data block #i from the database with reference to information contained in the received communication frame and then transmits the corresponding fault data block #i to the remote monitoring system 11 (S44).

The remote monitoring system 11 that receives the fault data from the digital protection relay 15 through the step S44 decides whether or not the entire fault data have been received (S45).

If it is determined at the step S45 that there remains a fault data block to be still received, the remote monitoring system 11 increases variable 'i' by '1' and then proceeds to the step S42 (S46). The remote monitoring system 11 requests the digital protection relay 15 of the next fault data block.

However, if it is determined at the step S45 that the entire fault data have been received, the reception procedure for the corresponding fault data is finished (S47).

That is, the steps S42 to S46 are repeatedly performed 'k' times. Here, the 'k' may be obtained as follows.

k=minimum integer among integers greater than (size of fault data intended to be received by remote monitoring system/size of fault data block) or more As a specific example, when assuming that the size of the fault data block is set as 256 bytes and the size of the fault data that the remote monitoring system 11 is to be received from the digital protection relay 15 is 168 Kbytes, 168*1024/256=672. Therefore, the 'k' is 672. In this case, the steps S42 to S46 are repeatedly performed 672 times.

Meanwhile, the remote monitoring system 11 may first identify whether or not the fault data to be received from the digital protection relay 15 currently exists in the digital protection relay 15.

Figure 6:
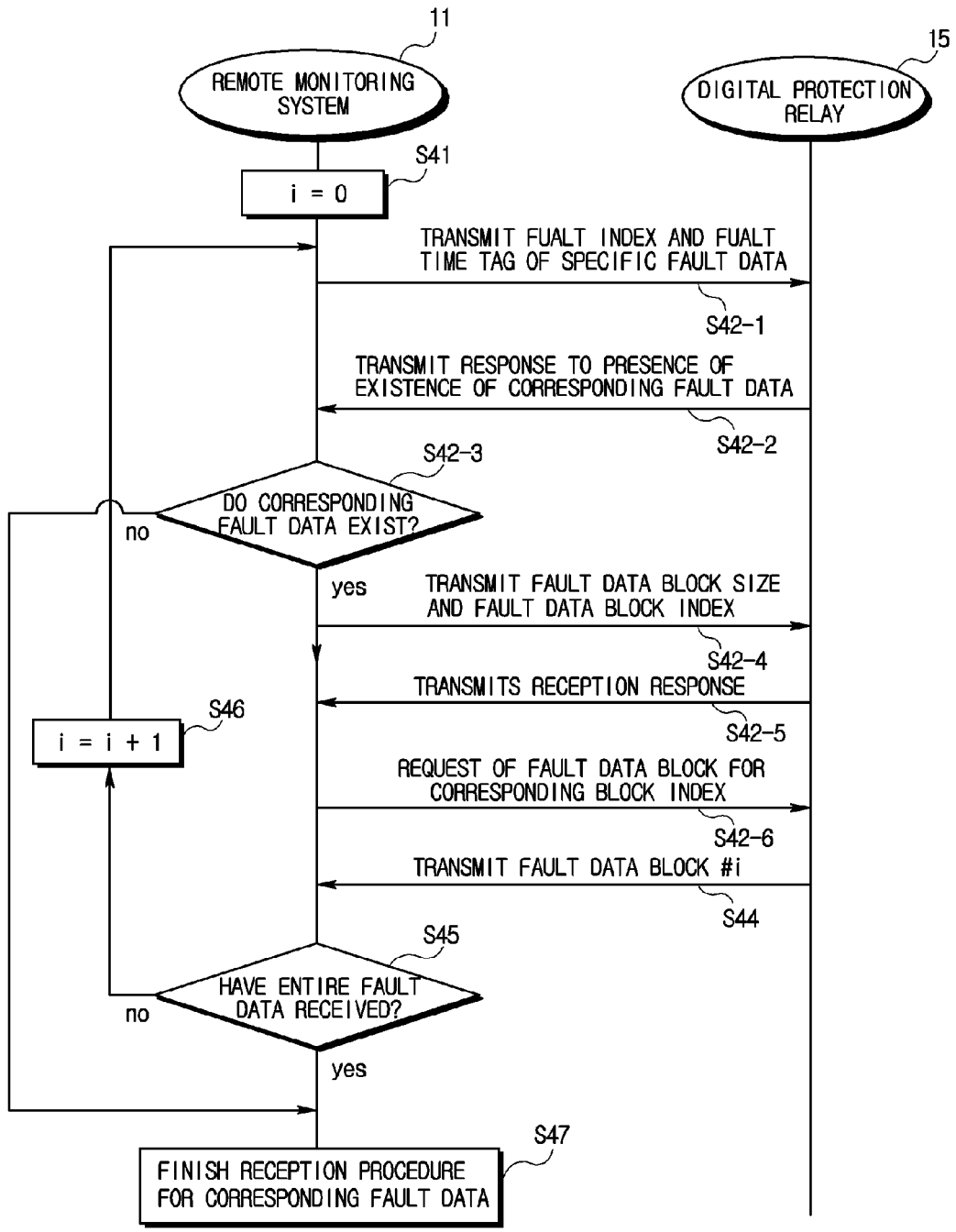
FIG. 6 is a flowchart illustrating another embodiment of the remote communication method according to the disclosure.

An embodiment related to this will be described with reference to FIG. 6. In this embodiment, the steps S41 and S44 to 47 are identical to those of the embodiment described with reference to FIG. 4, and therefore, overlapping descriptions will be omitted.

The remote monitoring system 11 first transmits the fault index and fault time tag of specific fault data to the digital protection relay 15 so as to inquire of the digital protection relay 15 whether the corresponding fault data exists (S42-1).

The digital protection relay 15 inquires of the database based on the inquiry at the step S42-1, and identifies whether or not the fault data having the corresponding fault index and fault time tag exist. Then, the digital protection relay 15 transmits the identified result as a response to the remote monitoring system 11 (S42-2).

If the corresponding fault data exist as the result received as the response from the digital protection relay 15 through the step S42-2 (S42-3), the remote monitoring system 11 transmits the fault data block size and the fault data block index in the current order to the digital protection relay 15 (S42-4). If the corresponding fault data do not exist, the reception procedure for the corresponding fault data is finished (S47).

The digital protection relay 15 transmits, to the remote monitoring system 11, a response that the digital protection relay 15 has received the fault data block size and the fault data block index, transmitted by the remote monitoring system 11 at the step S42-4 (S42-5).

The remote monitoring system 11 that has received the response at the step S42-5 requests the digital protection relay 15 of the fault data in the current order, which is specified with respect to the specific fault data transmitted through the step S42-1 (S42-6).

The communication software 25-2 of the digital protection relay 15 fetches the corresponding fault data block #i requested at the step 42-6 from the database and transmits the corresponding fault data block #i to the remote monitoring system 11 (S44).

The remote monitoring system 11 that has received the fault data from the digital protection relay 15 decides whether or not the entire fault data have been received (S45).

If it is decided at the step S45 that there remains a fault data block to be still received, the remote monitoring system 11 increases variable 'i' by '1' and then proceeds to the step S42 (S46). If it is decided at the step S45 that the entire fault data have been received, the reception procedure for the corresponding fault data is finished (S47).

Although the disclosure has been described in connection with the preferred embodiments, the embodiments of the disclosure are only for illustrative purposes and should not be construed as limiting the scope of the disclosure. It will be understood by those skilled in the art that various changes and modifications can be made thereto within the technical spirit and scope defined by the appended claims.

What is claimed is:

1. A remote communication system, the system comprising:
   a digital protection relay configured to store and maintain fault indices for identifying a predetermined number of faults that have occurred, fault time tags corresponding to the fault indices and fault data corresponding to the fault indices; and
   a remote monitoring system configured to set a fault index, fault time tag, fault data block size, and fault data block index for specifying a fault data block of one or more fault data blocks of the fault data to be communicated, and to request the fault data block from the digital protection relay,
   wherein the digital protection relay transmits the specified fault data block to the remote monitoring system based on the fault index, fault time tag, fault data block size, and fault data block index received from the remote monitoring system.

2. The system of claim 1, wherein the remote monitoring system is further configured to request fault data blocks of the one or more fault data blocks from the digital protection relay until the entire fault data is substantially received.

3. The system of claim 1, wherein the fault index, fault time tag, fault data block size, and fault data block index are set in a user-defined area of a communication frame that the remote monitoring system transmits to the digital protection relay.

4. The system of claim 1, wherein, when an additional fault occurs, the digital protection relay deletes fault data related to the oldest fault index.

5. The system of claim 1, wherein the remote monitoring system is further configured to:
   receive the specified fault data block;
   determine if all of the one or more fault data blocks of the fault data has been received; and
   request another fault data block from the digital protection relay that has a fault data block index incremented by one from the fault data block index of the specified fault data block if not all of the one or more fault data blocks of the fault data have been received.

6. A method of performing remote communication between a digital protection relay and a remote monitoring system, the method comprising:

storing fault indices for identifying a predetermined number of faults that have occurred, fault time tags corresponding to the fault indices, and fault data corresponding to the fault indices;

receiving a request for specific fault data from the remote monitoring system, the request including a fault index, fault time tag, fault data block size, and fault data block index corresponding to a fault data block of one or more fault data blocks of the specific fault data; and transmitting the corresponding fault data block from among the stored fault data to the remote monitoring system based on the requested fault index, fault time tag, fault data block size, and fault data block index.

7. The method of claim 6, further comprising, repeatedly performing the receiving and transmitting operations until all of the one or more fault data blocks of the entire specific fault data is transmitted to the remote monitoring system.

8. The method of claim 6, wherein the fault index, fault time tag, fault data block size, and fault data block index are set in a user-defined area of a communication frame that the remote monitoring system transmits to the digital protection relay.

9. The method of claim 6, further comprising, removing fault data related to the oldest fault index when an additional fault occurs.

10. A method of performing remote communication between a digital protection relay and a remote monitoring system, the method comprising:

setting a fault index, fault time tag, fault data block size, and fault data block index corresponding to a fault data block of one or more fault data blocks of fault data to be communicated;

requesting the corresponding fault data block from the digital protection relay; and receiving the corresponding fault data block from the digital protection relay based on the fault index, fault time tag, fault data block size, and fault data block index.

11. The method of claim 10, further comprising, repeatedly performing the setting, requesting, and receiving operations until all of the fault data blocks for the entire fault data is received from the digital protection relay.

12. The method of claim 10, wherein the fault index, fault time tag, fault data block size, and fault data block index are set in a user-defined area of a communication frame that the remote monitoring system transmits to the digital protection relay.

13. The method of claim 10, further comprising, requesting the digital protection relay to identify whether or not the fault data exists.

* * * * *